United States Patent
Bhatia et al.

(10) Patent No.: US 7,249,375 B2
(45) Date of Patent: Jul. 24, 2007

(54) METHOD AND APPARATUS FOR END-TO-END IDENTITY PROPAGATION

(75) Inventors: Gaurav Bhatia, Foster City, CA (US); Arun Swaminathan, San Carlos, CA (US)

(73) Assignee: Oracle International Corp, Redwood Shores, CA (US)

( * ) Notice: Subject to any disclaimer, the term of this patent is extended or adjusted under 35 U.S.C. 154(b) by 740 days.

(21) Appl. No.: 10/682,947

(22) Filed: Oct. 9, 2003

(65) Prior Publication Data

US 2005/0039008 A1    Feb. 17, 2005

Related U.S. Application Data

(60) Provisional application No. 60/492,840, filed on Aug. 5, 2003.

(51) Int. Cl.
*H04L 9/32* (2006.01)
(52) U.S. Cl. .............................. 726/8; 726/3; 713/185
(58) Field of Classification Search .................... 726/8, 726/3; 713/172, 182, 185; 709/225
See application file for complete search history.

(56) References Cited

U.S. PATENT DOCUMENTS 6,128,738 A * 10/2000 Doyle et al. ................ 713/185

7,136,857 B2 * 11/2006 Chen et al. .................... 707/10

FOREIGN PATENT DOCUMENTS

WO    WO 01/53971    7/2001

* cited by examiner

*Primary Examiner*—Thanhnga B. Truong
(74) *Attorney, Agent, or Firm*—Park, Vaughan & Fleming LLP

(57) ABSTRACT

One embodiment of the present invention provides a system that facilitates end-to-end identity propagation to a backend-tier application that is not single sign-on enabled. During operation, the system receives request from a user at a middle-tier application to access private data from the backend-tier application. Upon receiving this request, the system redirects the user to a single sign-on server that verifies authentication credentials of the user. The middle-tier application then receives a token from the single sign-on server authorizing access to a backend-tier application. Next, the middle-tier application uses the token to access the private data from the backend-tier application, and then provides the private data to the user.

16 Claims, 4 Drawing Sheets

METHOD AND APPARATUS FOR END-TO-END IDENTITY PROPAGATION

RELATED APPLICATIONS

This application hereby claims priority under 35 U.S.C. §119 to U.S. Provisional Patent Application No. 60/492,840, filed on Aug. 5, 2003, entitled "Method and Apparatus for End-To-End Identity Propagation," by inventors Gaurav Bhatia and Arun Swaminathan.

BACKGROUND

1. Field of the Invention

The present invention relates to techniques for providing authentication within computer systems. More specifically, the present invention relates to a method and an apparatus that provides end-to-end identity propagation to support access to computer applications.

2. Related Art

Existing computer systems provide user authentication in a point-to-point fashion. As principals (users or servers) access different computer systems, or as application services access other services in the user's behalf, the secure flow of identity can be lost. This is particularly true in web-based and enterprise computing environments where an end-user accesses multiple application services, which in turn access other services on behalf of the user. Existing systems suffer from the problem that there is no centralized trust model. Consequently, it is possible for an application service to impersonate a user, which gives rise to potential security problems.

Some systems provide a single sign-on (SSO) service that can be used as a single point of authentication for partner applications, and can thereby facilitate end-to-end authentication for the partner applications. In these systems, partner applications can receive user authentication through a token issued by the SSO server. These partner applications can, in turn, access other partner applications using the SSO token, thereby maintaining the end-to-end authentication, and providing a centralized trust model.

Unfortunately, even if an SSO service exists within a computer system, applications that are not SSO-enabled and third-party applications, such as web-based applications, still have a fragmented trust model. Some applications that are not SSO-enabled, for example a relational database management system (RDBMS), can provide authentication based on user identities in a number of ways. Users may be defined locally to an RDBMS instance. Users may be authenticated by an external repository, such as a Kerberos system, a remote authentication dial-in user service (RADIUS), or a lightweight directory access protocol (LDAP) service. Additionally, enterprise users may be authenticated using the public key infrastructure (PKI) or may be password authenticated. While these methods each have advantages, they do not provide a centralized trust model and consequently have security problems.

Hence, what is needed is a method and an apparatus that provides end-to-end identity propagation across multiple layers of computer applications with a heterogeneous technology stack without the problems described above.

SUMMARY

One embodiment of the present invention provides a system that facilitates end-to-end identity propagation to a backend-tier application that is not single sign-on enabled. During operation, the system receives a request from a user at a middle-tier application to access private data from the backend-tier application. Upon receiving this request, the system redirects the user to a single sign-on server that verifies authentication credentials of the user. The middle-tier application then receives a token from the single sign-on server authorizing access to a backend-tier application. Next, the middle-tier application uses the token to access the private data from the backend-tier application, and then provides the private data to the user.

In a variation of this embodiment, the token includes the authentication credential of the user, and is recognized as valid by a backend-tier application.

In a further variation, the backend-tier application can use the token to access applications in an additional tier of applications.

In a further variation, the token includes a security certificate, and is recognized as valid by a single sign-on enabled database application.

In a further variation, the single sign-on enabled database application can use the token to access applications in an additional tier of applications.

In a further variation, the token includes a user-name and a password that can be used by the middle-tier application to access a third-party service.

In a further variation, the token is a standards based extensible markup language (XML) formatted token recognized by third party services which comply with web standards.

In a further variation, the third-party service includes a web-based application.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 1:
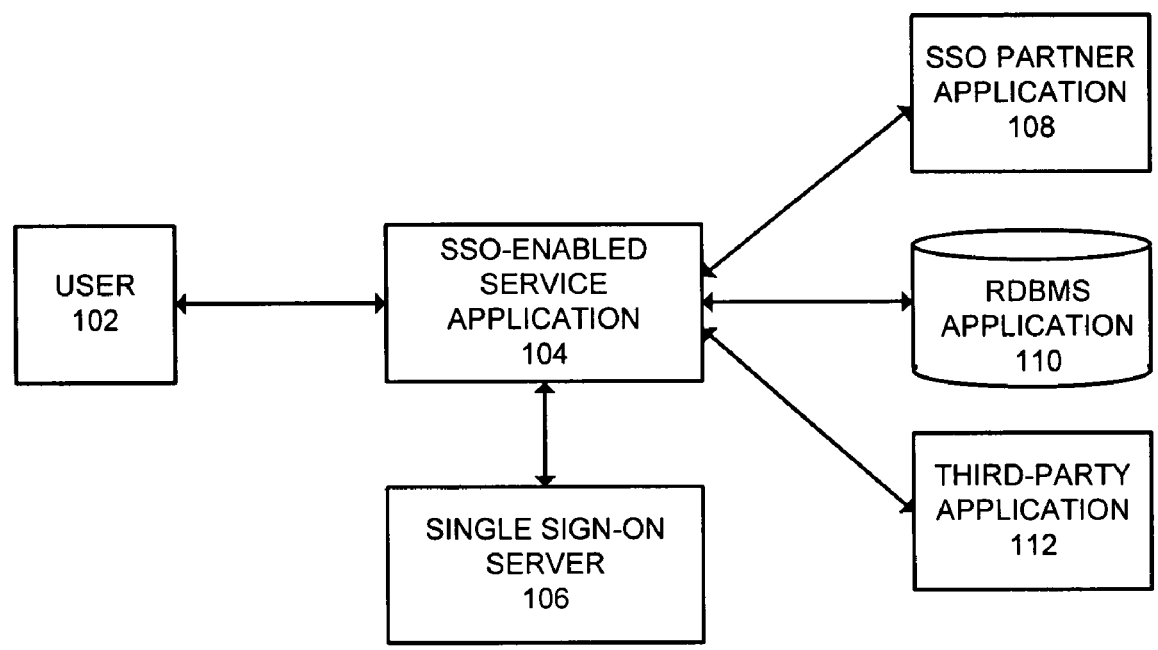
FIG. 1 illustrates computer systems coupled together in accordance with an embodiment of the present invention.

FIG. 1 illustrates computer systems coupled together in accordance with an embodiment of the present invention. The system includes single sign-on (SSO) enabled service application 104, SSO server 106, SSO partner application 108, relational database management system (RDBMS) application 110, and third-party application 112. SSO-enabled service application 104 receives requests from user 102 to access backend-tier applications, such as SSO partner application 108, RDBMS application 110 and third-party application 112.

Upon receiving a request to access a backend-tier application, SSO-enabled service application 104 redirects the request to SSO server 106. SSO server 106 authenticates user 102 and returns an access token (not shown). SSO-enabled service application 104 then uses this token to access the backend-tier application.

If user 102 is requesting access to SSO partner application 108, SSO-enabled service application 104 forwards the access token to SSO partner application 108. SSO partner application 108 accepts the access token and provides the requested information to user 102 via SSO-enabled service application 104. Additionally, SSO partner application 108 can use the access token to access additional tiers of applications on behalf of user 102. Details of accessing RDBMS application 110 and third-party application 112 are discussed below in conjunction with FIGS. 2-4.

SSO server 106 can issue tokens in multiple formats based upon the capabilities of the target system. Hence, SSO server 106 is able to do end-to-end identity propagation in a heterogeneous environment. Note that SSO server 106 can determine the type of target system-whether the target system is SSO partner application 108, RDBMS application 110, or third-party application 112 and in the case of third-party application 112 whether a user/password or standards based token is required. Based upon the target type, the appropriate token is issued.

Database Application Access

Figure 2:
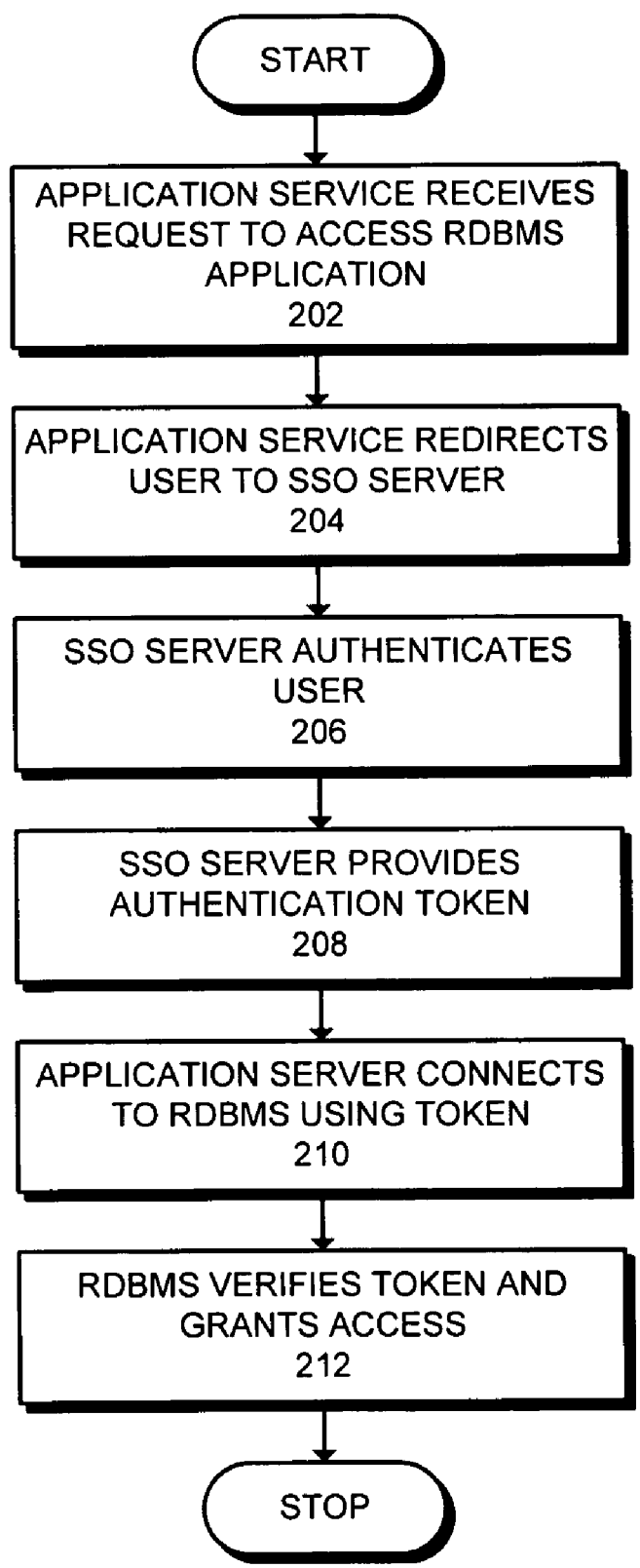
FIG. 2 presents a flowchart illustrating the process of accessing a database application in accordance with an embodiment of the present invention.

FIG. 2 presents a flowchart illustrating the process of accessing a relational database management system (RDBMS) application in accordance with an embodiment of the present invention. Note that the same process can be used for other backend applications as well. The system starts when a middle-tier application service receives a request from a user to access the RDBMS application (step 202). Next, the application service redirects the user to the single sign-on (SSO) server (step 204). The SSO server then authenticates the user by requesting, receiving, and verifying user credentials received from the user (step 206)

After authenticating the user, the SSO server provides an authentication token, which includes authentication data and access data for the user (step 208). Note that this authentication data can include a Kerberos ticket, a PKI certificate, a standards based extensible markup language (XML) token, and/or a user name/password for the user. The application service then connects to the RDBMS using the authentication token (step 210). Finally, the RDBMS verifies the token and grants access to the user (step 212).

Database Application Access Using Proxy

Figure 3:
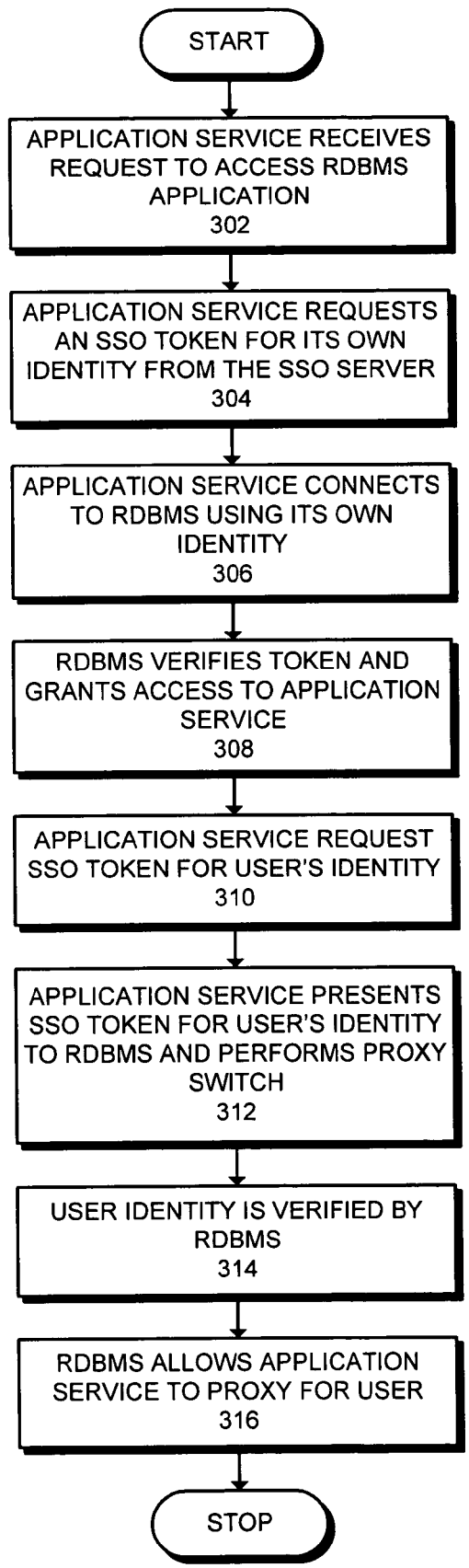
FIG. 3 presents a flowchart illustrating how an application service accesses a database as a proxy for a user in accordance with an embodiment of the present invention.

FIG. 3 presents a flowchart illustrating how an application service accesses a database as a proxy for a user in accordance with an embodiment of the present invention. The system starts when a middle-tier application service receives a request from a user to access the RDBMS application (step 302). In response, the application service requests an SSO token for its own identity from the SSO server (step 304). Next, the application service connects to the RDBMS using its own identity and the SSO token (step 306). The RDBMS then verifies the token and grants access to the application service (step 308).

The application service then requests an SSO token from the SSO server for the user's identity (step 310). The application service presents this SSO token for the user's identity to the RDBMS and performs a proxy switch (step 312). Next, the RDBMS verifies the user's identity from the SSO token (step 314). Finally, the RDBMS allows the application service to proxy for the user (step 316).

Accessing an External Application

Figure 4:
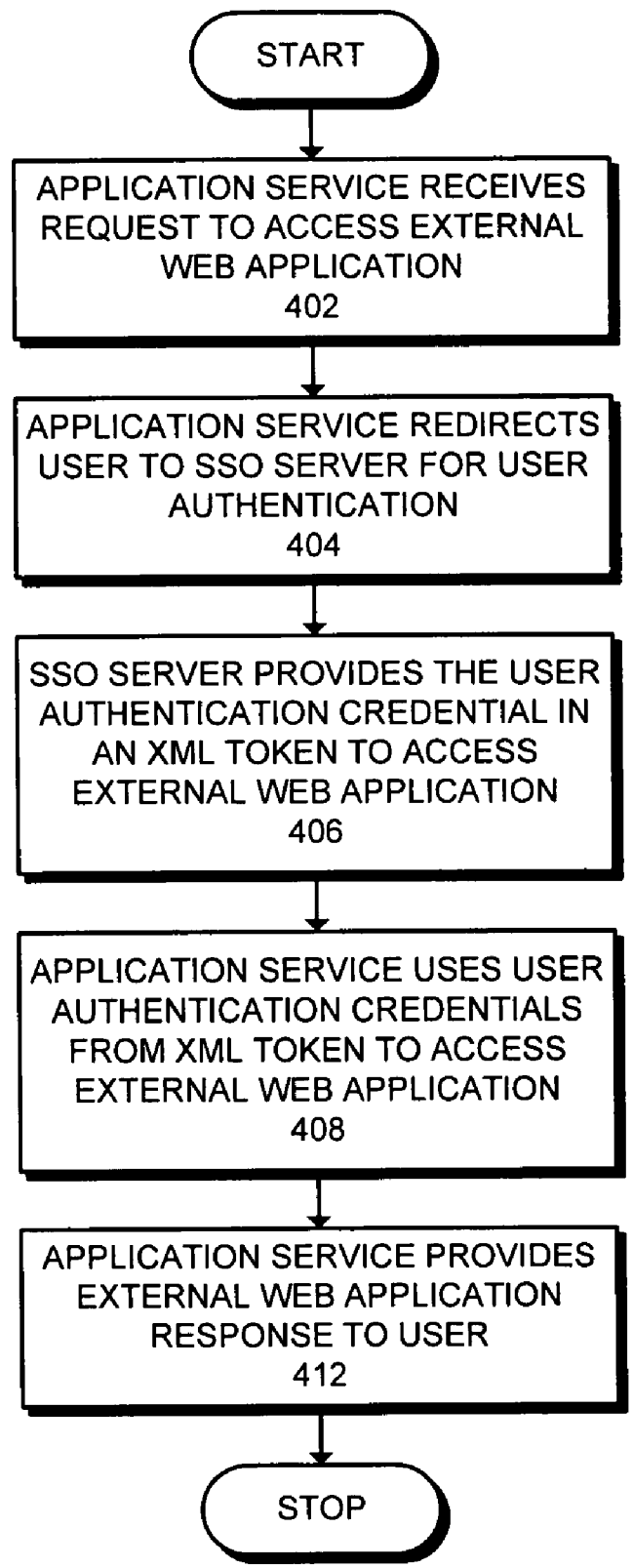
FIG. 4 presents a flowchart illustrating the process of accessing an external application in accordance with an embodiment of the present invention.

FIG. 4 presents a flowchart illustrating the process of accessing an external application in accordance with an embodiment of the present invention. The system starts when an application service receives a request to access an external application such as a web-based application (step 402). Upon receipt of this request, the application service redirects the user to the SSO server for user authentication (step 404). The application service, in turn, provides the authentication credential to access the external web application (step 406). This authentication credential can be in an XML token.

After receiving the authentication credential, the application service uses the authentication credential in the XML token to access the external web application (step 408). Finally, the application service provides the responses from the external web application to the user (step 410).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for end-to-end identity propagation to a backend-tier application that is not single sign-on enabled, comprising:

receiving a request from a user at a middle-tier application to access private data from the backend-tier application;

redirecting the user to a single sign-on server;

receiving a token from the single sign-on server, wherein the token is used to verify the user's identity;

presenting the token to the backend-tier application to prove that the middle-tier is authorized to act as the user's proxy;

performing a proxy switch, thereby causing the middle-tier application to act as the user's proxy;

accessing the private data from the backend-tier application; and providing the private data to the user.

2. The method of claim 1, wherein the token includes the authentication credential of the user, and wherein the token is recognized as valid by a backend-tier application.

3. The method of claim 2, wherein the backend-tier application can use the token to access applications in an additional tier of applications.

4. The method of claim 1, wherein the token includes a security certificate, and wherein the security certificate is recognized as valid by a single sign-on enabled database application.

5. The method of claim 4, wherein the single sign-on enabled database application can use the token to access applications in an additional tier of applications.

6. The method of claim 1, wherein the token includes a user-name and a password that can be used by the middle-tier application to access a third-party service.

7. The method of claim 6, wherein the token includes a standards based extensible markup language (XML) formatted token recognized by the third party service which complies with web standards.

8. The method of claim 7, wherein the third-party service includes a web-based application.

9. An apparatus for end-to-end identity propagation to a backend-tier application that is not single sign-on enabled, comprising:
- a receiving mechanism configured to receive a request from a user at a middle-tier application to access private data from the backend-tier application;
- a redirecting mechanism configured to redirect the user to a single sign-on server;
- wherein the receiving mechanism is further configured to receive a token from the single sign-on server, wherein the token is used to verify the user's identity;
- a presenting mechanism configured to present the token to the backend-tier application to prove that the middle-tier is authorized to act as the user's proxy;
- a proxy-switching mechanism configured to perform a proxy switch, thereby causing the middle-tier application to act as the user's proxy;
- an accessing mechanism configured to access the private data from the backend-tier application; and
- a providing mechanism configured to provide the private data to the user.

10. The apparatus of claim 9, wherein the token includes the authentication credential of the user, and wherein the token is recognized as valid by a backend-tier application.

11. The apparatus of claim 10, wherein the backend-tier application can use the token to access applications in an additional tier of applications.

12. The apparatus of claim 9, wherein the token includes a security certificate, and wherein the security certificate is recognized as valid by a single sign-on enabled database application.

13. The apparatus of claim 12, wherein the single sign-on enabled database application can use the token to access applications in an additional tier of applications.

14. The apparatus of claim 9, wherein the token includes a user-name and a password that can be used by the middle-tier application to access a third-party service.

15. The apparatus of claim 14, wherein the token includes a standards based extensible markup language (XML) formatted token recognized by the third party service which complies with web standards.

16. The apparatus of claim 15, wherein the third-party service includes a web-based application.

* * * * *